May 28, 1957 H. E. PARK 2,794,108
WELDING METHOD AND APPARATUS
Original Filed Aug. 31, 1953
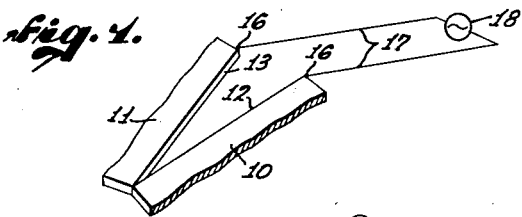
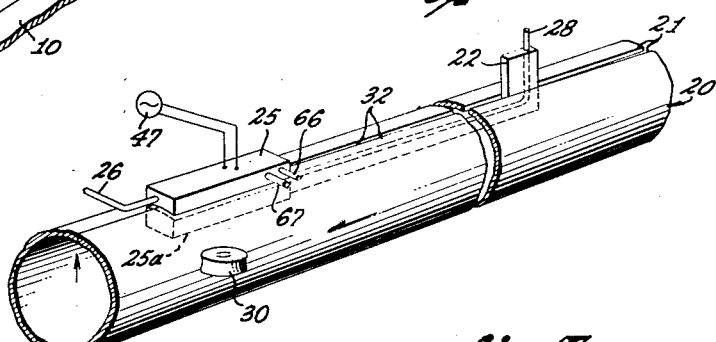
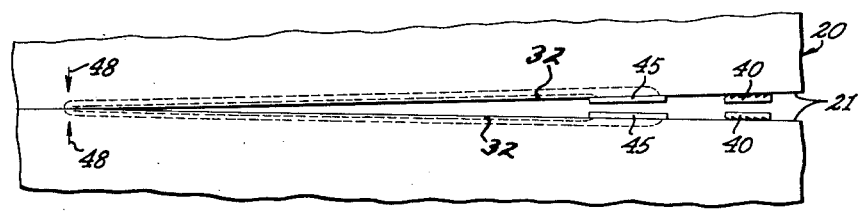
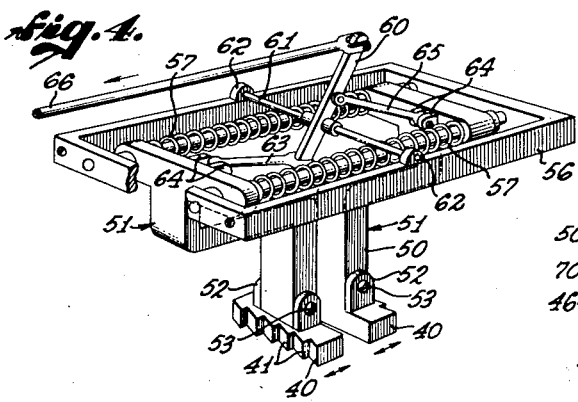
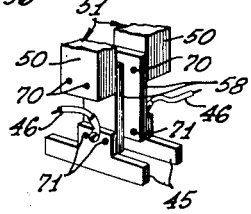
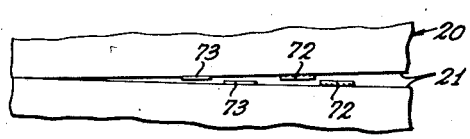
Harwood E. Park,
INVENTOR.
BY Gerald H. Peterson
ATTORNEY.

United States Patent Office 2,794,108
Patented May 28, 1957

2,794,108

WELDING METHOD AND APPARATUS

Harwood E. Park, Venice, Calif., assignor of one-third to Gerald H. Peterson, Santa Monica, Calif.

Original application August 31, 1953, Serial No. 377,475. Divided and this application January 4, 1955, Serial No. 479,721

6 Claims. (Cl. 219—67)

This invention relates to method and apparatus for heating the edges of a sheet of metal being continuously welded together to make pipe.

The invention has special advantages in the butt-welding of relatively large pieces of metal and, for the purpose of disclosure and illustration, such a butt-welding procedure will be described herein.

One of the factors inherent in the invention that makes it so advantageous for butt-welding resides in the skin effect created by using a heating current of relatively high frequency. To make an effective butt-weld the two opposed faces of metal need to be heated to only slight depth, since theoretically all that is required is merger of the surface molecules. In practice, of course, it is impossible to avoid heating the metal surfaces to substantial depth but, even so, conventional welding practices are grossly wasteful in the excessive heating of a large proportion of the metal outside the actual welding zone. The skin effect makes it possible to approach more closely the ideal of a short steep temperature gradient reaching peak welding temperature at the surfaces of the metal to be joined.

The preferred practice of my invention includes special provision to clean and prepare the surfaces that are to merge in the welding procedure. The object is to remove all foreign material, oxides and scale, to result in clean virgin metal surfaces at the moment of merger. This preparatory step not only produces a weld of exceptionally high quality but also avoids the necessity of placing the metal under excessive pressure, as is usually done in an effort to push such contaminants as oxide to the surface of the weld metal. It is further contemplated in this preferred practice of the invention that the surfaces to be welded will be cleaned in an inert or reducing atmosphere and maintained in such atmosphere up to and including the welding stage, thus avoiding recontamination of the metal surfaces.

The various features and advantages of the invention may be understood from the following detailed description of the preferred practice of the invention, taken with the accompanying drawings.

In the drawings, which are to be regarded as merely illustrative:

Fig. 1 is a diagram illustrating one of the simplest practices of the invention.

Fig. 2 is a perspective view, largely diagrammatic, indicating how the invention may be practiced for continuously welding large diameter pipe, parts of the apparatus being omitted for clarity.

Fig. 3 shows the converging longitudinal edges as seen from inside the split cylinder.

Fig. 4 shows an assembly to be used inside the hood to carry the scraper helmets.

Fig. 5 shows an arrangement for mounting two electrode plates on the end portions of brackets.

Fig. 6 shows two scraper helmets staggered with respect to one another.

Fig. 1 illustrates a procedure of the utmost simplicity for butt-welding two metal plates 10 and 11 along their longitudinal edges 12 and 13 respectively. The two metal plates 10 and 11 are relatively wide plates and the problem is to heat the longitudinal edges 12 and 13 to welding temperature by resistance to the flow of an electric current and by the molecular friction caused by alternating the current, without such heating effects occurring to any wasteful extent in other portions of the two plates.

In accord with the teachings of the invention it is contemplated that the current used for the resistance heating of the two edges 12 and 13 will be of sufficiently high frequency to flow with a pronounced skin effect.

The frequency of the alternating current will depend upon the degree to which it is desirable to create the skin effect in the flow of the current. For butt-welding steel plates in the manner indicated by Fig. 1 the frequency should be at least 3 kilocycles and in most practices of the invention may be from 25 to 50 kilocycles or higher.

A feature of this practice of the invention is the concept of placing the two longitudinal edges 12 and 13 in series in a circuit simply by placing the two metal plates 10 and 11 in a divergent edge-to-edge relationship. Thus the two metal edges 12 and 13 are in mutual contact at one end and are spaced apart at their opposite ends, the divergent ends being connected into a suitable electric circuit which supplies the high frequency current.

Fig. 1 shows diagrammatically a pair of electrodes 16 which are connected by a pair of conductors 17 with a suitable source 18 of high frequency alternating current. When the two edges 12 and 13 have reached welding temperature the two edges are pressed together with sufficient pressure to form the butt-welded joint. It is apparent that selection of the proper frequency and the control of power and heating time makes possible the fulfillment of any desired heating requirements for butt-welding.

The general arrangement of a preferred embodiment of apparatus for welding pipe of heavy sheet metal is shown in Fig. 2. The sheet metal, generally designated 20, is rolled to form split cylinders having longitudinal edges 21 and it is contemplated that the longitudinally split cylinders will be moved through the apparatus at a constant rate in a continuous process. The ends of the cylinders may be temporarily united as they are fed to the apparatus, for example, by tack welding at the ends of the longitudinal edges 21. As the welded cylinders emerge from the apparatus the tack welding at the ends of the cylinders may be severed or girth-welds may be completed, as desired.

As the split cylinders move through the apparatus they pass a vertical splitter bar 22 of nonconducting material or at least with a nonconducting surface, which splitter bar holds the two longitudinal edges 21 of the metal apart to provide a gap or spacing between the two edges. The splitter bar may be, for example, two inches thick. At a substantial distance beyond the splitter bar 22 is a suitable hood 25 which encloses the processing zone in which the metal is heated and is brought together under welding pressure. Preferably a preliminary cleaning operation is also performed in this processing zone.

The purpose of the hood 25 is to confine a protective atmosphere throughout the region in which the metal edges are cleaned, heated, and forced together to form the butt-weld. The protective atmosphere may be any gas or vapor or combination thereof that will prevent the formation of any undesirable compounds, especially oxides, on the surfaces to be welded. The hood 25 may be made of asbestos and may be supplied with a suitable inert gas or reducing gas by a supply pipe 26 in a manner well understood in the art.

Preferably, a second and similar hood 25a is mounted below inside the traveling cylinder to cooperate with the outer hood 25. This second inner hood may be mounted on an arm supported by the splitter bar 22 and may be supplied by a pipe 28 extending through the splitter bar.

It is contemplated that the cylindrical work metal will be moved longitudinally through the apparatus by suitable drive rolls and at the same time the split metal cylinder will be progressively contracted to bring the longitudinal edges 21 together inside the hood 25, preferably near the far end of the hood. For this purpose a suitable roller assembly may be employed such as known in the art. Fig. 2 shows one of the rolls 30 of such a roller assembly.

Fig. 3 shows the converging longitudinal edges 21 as seen from below, that is to say, looking upwards from inside the split cylinder, and all of this figure is included in the processing zone encompassed by hoods 25 and 25a.

The first operation performed in the inert gas of the processing zone is the cleaning of the two opposed faces of the longitudinal edges 21 that are to be merged together to form the butt-weld. Any suitable cleaning or abrading means may be employed for this operation. In the present embodiment of the invention, for example, I employ hardened steel scraper elements 40 each of which is formed with teeth having relatively sharp leading edges 41 directed towards the rear of the apparatus to meet the traveling metal. Such scraper elements may be made of stellite, an alloy of steel with cobalt and 10 to 50 percent chromium and/or tungsten. It is contemplated that the scraper elements 40 will be movably and resiliently mounted with suitable yielding means continuously urging the two scraper elements outward against the longitudinal edges of the traveling metal.

As the traveling metal passes beyond the scraper elements 40 the newly cleaned metal surfaces stay bright because they are enveloped by the inert atmosphere inside the two hoods 25 and 25a. The clean metal surfaces of the longitudinal edges 21 then move into contact respectively with a pair of electrodes or electrode plates 45 which, as indicated in Fig. 2, are connected by a pair of conductors 46 with a suitable source 47 of alternating current of the required high frequency. The two electrodes 45 like the scraper elements 40 are suitable mounted with yielding means pressing the two electrodes outward against the opposed faces of the two longitudinal edges 12 of the traveling cylinder.

The assembly of rolls that moves the metal cylinder through the processing zone and contracts the cylinder to make the butt-weld is adjusted to cause the longitudinal edges 21 to meet in mutual pressure contact at what may be termed a squeeze point. This squeeze point is indicated by the arrows 48 in Fig. 3 and is at the far end of the processing zone inside the two hoods 25 and 25a. It is apparent that this arrangement places the two longitudinal heating zones 32 of the metal in series with the high frequency source 47 in the same manner as shown in Fig. 1, and that the high frequency current is largely concentrated in the two zones 32 as indicated by the dotted lines in Fig. 3.

As previously stated the power and the heating time as well as the frequency of the current are factors to be considered in applying the invention to the task of heating the edges of metal for butt-welding. It is apparent that for a given frequency and a given power input the longitudinal travel of the split metal cylinder will be regulated to provide sufficient time for the metal along the longitudinal edges 21 to reach welding temperature as the metal edges reach the squeeze point. It is contemplated that the rolls 30 will be adjusted to continue to contract the traveling metal cylinder to a sufficient extent beyond the squeeze point 48 to cause the metal to be at least slightly upset at the weld, thus assuring effective merger of the two metal edges.

Fig. 4 shows, by way of example, a mechanism or assembly that may be employed inside the hood 25 to carry the two scraper elements 40 and may be duplicated to carry the pair of electrodes 45.

In Fig. 4 the two scraper elements 40 are mounted respectively on the downwardly extending portions 50 respectively of a pair of angular brackets 51. In the particular construction shown the scraper elements 40 have suitable ears 52 to receive suitable screws 53 for mounting the scraper elements on the two brackets. Each of the two brackets 51 has two bores in its upper end by means of which the bracket is slidingly mounted on a pair of parallel rods that extend transversely of the hood 25. The parallel rods 55 are mounted in a suitable rectangular frame 56 that is, in turn, mounted inside the hood 25. Helical springs 57 are mounted on the two rods 55 respectively in compression between the two brackets 51 to serve as yielding means for continuously urging the two brackets apart thereby to continuously press the scraper elements 40 outward against the longitudinal edges 21 of the traveling metal cylinder.

Preferably manually operable means is provided to contract the two scraper elements 40 towards each other as when a split metal cylinder is first fed into the apparatus. For this purpose a lever 60 may be provided on a shaft 61 journalled in suitable bearings 62 on the rectangular frame 56. A suitable link 63 is pivotally connected at one end to the lower arm of the lever 60 and is pivotally connected at the other end to a pair of ears 64 on the inner side of one of the brackets 51. In like manner a second link 65 connects the upper arm of the lever 60 with a pair of ears 64 on the other of the two brackets 51. The upper end of the lever 60 is pivotally connected to a suitable pull rod 66 that extends through the side wall of the hood 25 for manual manipulation outside the hood. It is apparent from an inspection of Fig. 4 that manually shifting the pull rod 66 outward will cause the lever 60 acting through the links 63 and 65 to draw the two brackets 51 towards each other in opposition to the springs 57 thereby to move the two scraper elements 40 towards each other.

If desired, suitable latch means (not shown) may be provided to releasably hold the pull rod 66 in its outward position.

The two electrode plates 45 may be mounted on a second mechanism or assembly such as shown in Fig. 4, the second mechanism having a pull rod 67 shown in Fig. 2 for operation in the manner just described. The two electrode plates 45 may be mounted respectively on the end portions 50 of the second pair of brackets 51 in the manner indicated in Fig. 5. In Fig. 5 the end portions 50 of the two brackets are shortened and are provided on their inner faces with short downwardly extending bars 58 of suitable nonconducting material. The bars 58 may, for example, be made of a suitable ceramic and may be attached to the brackets 51 by suitable screws 70. The two electrode plates 45 are shown connected to the nonconducting bars 58 by suitable screws 71 and thus are suitably insulated from the brackets 51 by the nonconducting bars.

In some practices of the invention where the tapered gap between the longitudinal edges 21 of the traveling split metal cylinder is relatively narrow, it may be desirable to offset the lower end portions 50 of the brackets 51 so that the scraper elements 40 and the electrodes 45 are in staggered positions. Thus Fig. 6 shows two scraper elements 72 staggered with respect to each other and two electrode plates 73 that are in similarly staggered positions.

It is apparent that the electrodes 45 connect the two longitudinal edges 21 in series in the same manner as previously explained, and that the high frequency current is concentrated in the two narrow zones 32 along these edges. Further concentration of the surface-seeking current is favored by abrading the edges 21 to make their surfaces bright and clean. The enveloping inert or reducing atmosphere keeps the new surfaces free from contamination as the leave the scraper elements and throughout the heating stage until the two metal surfaces finally merge together. Thus a superior weld is obtained with minimum contamination of the metal as well as with minimum diffusion or dispersion of the electric heating current.

It will also be understood that, as pointed out above, cleaning the faces of the edges, as by scraping, and the use of the inert atmosphere are preferred features of the invention and that these preferred features are not essential for all cases.

This application is a division of my copending application, Serial No. 377,475, filed August 31, 1953, which is a continuation-in-part of my application Serial No. 238,881, filed July 27, 1951 (both now abandoned).

It is to be understood that various changes, modifications and departures from any specific disclosure may be made by those skilled in the art within the scope and spirit of the invention as defined in the appended claims.

I claim:

1. In the method of continuously forming elongated sheet metal into tubing in which the sheet is moved longitudinally and continuously formed into a tube C-shaped in cross-section with longitudinal edges spaced from and facing one another, and at a stationary welding zone the edges are continuously pressed together forming a stationary elongated V-gap between the moving edges, and the moving edges of the stationary V-gap are heated to effect a weld at a welding point located at the apex of said V-gap, the improvement for heating substantially only the surfaces of the moving edges within the stationary V-gap to welding temperature and with an increase of concentration of heating on the surfaces of the moving edges toward the apex of said V-gap, which comprises passing a high frequency current from one point on the stationary V-gap along one of said moving edges to said apex and back on the other moving edge to a point on the other side of said V-gap, said points being shortly in advance of said apex and said high frequency current being of such radio frequency that the lowest impedance path therefor in the metal of the tube between said points is provided along the edges within the gap from said points to and from said welding point and the resulting current flow and consequent resistance heating being concentrated at such edges and acting to continue to increase the temperature of said edges until the edges merge at the welding point and the current confines itself to flow substantially on the surfaces of the edges with a skin effect, and maintaining said V-gap narrow so that the currents on the opposing edges flow close to one another and closer toward the apex whereby the interaction of said currents flowing along opposite edges of said narrow V-gap on one another causes the currents to flow further toward the surfaces of the edges and thereby heat substantially only the surfaces of the edges just prior to welding contact at the apex.

2. In a method as defined in claim 1 in which the surfaces of said edges are cleaned to expose virgin metal prior to welding.

3. The method for welding together the edges of a longitudinal gap in metal tubing which comprises longitudinally moving the tubing while pressing from opposite sides thereof to bring the gap edges together at a welding point thus forming the gap into a V-shaped formation, heating said edges to welding temperature by applying electrical contacts connected to a source of high frequency current of the order of several thousands of cycles per second or higher to points on the tubing at opposite sides of the gap at a position shortly in advance of said welding point and near said edges, said contacts being sufficiently near said welding point and said edges and said current being of such high frequency that it flows alternatingly from one contact to the other substantially following a path from one of said contacts along the surface of one edge of the gap to said welding point and along the surface of the opposite edge of said gap to the other contact and thereby heats substantially only said edges to said welding temperature, cleaning the surfaces of said edges in advance of said contacts to remove all foreign material, oxides and scale and expose virgin metal at the surfaces of said edges, said cleaning, said contacts, said heating, and said contacting for welding all being effected in an inert atmosphere so that the faces of said edges are maintained clean during said cleaning, said heating, and said welding.

4. Method in accordance with claim 1, and in which the tubing is advanced in slidable engagement with said contacts.

5. Method in accordance with claim 1 and in which the contacts slidably engage respectively the edge surfaces within the gap.

6. Apparatus for welding together the edges of a longitudinal gap in metal tubing comprising means for moving said tubing longitudinally, means pressing opposite sides of said tubing to bring the gap edges together at a welding point, and forming the gap edges in a V-shaped formation, means passing a high radio frequency electrical current along the surfaces of said edges within said V-shaped formation by way of said welding point and thereby heating said edges to welding temperature, means cleaning said edges prior to said heating thereof, and means maintaining said cleaning means, said edges while being heated, and said welding point in an inert atmosphere to avoid oxidation of the surfaces of said edges from cleaning, during heating and until welded together.

References Cited in the file of this patent

UNITED STATES PATENTS

| | | |
|---|---|---|
| 1,227,603 | Fox | May 29, 1917 |
| 2,066,668 | Bennett | Jan. 5, 1937 |
| 2,139,211 | Sessions | Dec. 6, 1938 |

FOREIGN PATENTS

| | | |
|---|---|---|
| 858,276 | Germany | Dec. 4, 1952 |